United States Patent
Sugimoto

(10) Patent No.: US 10,340,774 B2
(45) Date of Patent: Jul. 2, 2019

(54) TEMPERATURE ESTIMATING DEVICE OF ELECTRIC MOTOR

(71) Applicant: FANUC CORPORATION, Yamanashi (JP)

(72) Inventor: Yasunori Sugimoto, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/001,707

(22) Filed: Jan. 20, 2016

(65) Prior Publication Data

US 2016/0218600 A1 Jul. 28, 2016

(30) Foreign Application Priority Data

Jan. 22, 2015 (JP) .................. 2015-010642

(51) Int. Cl.
*H02K 11/25* (2016.01)
*H02P 29/60* (2016.01)
*H02P 29/64* (2016.01)

(52) U.S. Cl.
CPC .............. *H02K 11/25* (2016.01); *H02P 29/60* (2016.02); *H02P 29/64* (2016.02)

(58) Field of Classification Search
CPC .......... H02K 11/25; H02P 29/60; H02P 29/64
USPC ....................................... 703/130
See application file for complete search history.

(56) References Cited

U.S. PATENT DOCUMENTS 4,836,442 A 6/1989 Beckey
5,681,494 A * 10/1997 Suzuki ............... G03G 15/2003
219/216

2005/0041722 A1 2/2005 Tokita et al.
2008/0300819 A1* 12/2008 Koch ..................... G01K 1/16
702/131
2010/0324851 A1* 12/2010 Schneider ............... G01K 7/42
702/99

(Continued)

FOREIGN PATENT DOCUMENTS

CN 1584523 A 2/2005
CN 101115977 A 1/2008

(Continued)

OTHER PUBLICATIONS

English Translation of Japanese Publication No. 2014239631, published Dec. 18, 2014, 16 pages.

(Continued)

*Primary Examiner* — Michael P Nghiem
*Assistant Examiner* — Dacthang P Ngo
(74) *Attorney, Agent, or Firm* — Fredrikson & Byron, P.A.

(57) ABSTRACT

A temperature estimating device configured to estimate a temperature of an electric motor includes a temperature detecting part for acquiring a detected temperature detected by a temperature sensor attached to the electric motor, a memory part for successively storing the detected temperature acquired by the temperature detecting part at a predetermined sampling period, and a temperature estimating part for using the detected temperature stored by the memory part, a ratio of amount of change of the detected temperature with respect to time, and a coefficient as the basis to estimate a temperature of a measurement target part of the electric motor.

2 Claims, 6 Drawing Sheets

34 = TEMPERATURE SENSOR
40 = ROTOR
50 = STATOR
52 = STATOR CORE
54 = WINDING

(56) References Cited

U.S. PATENT DOCUMENTS

| | | | | |
|---|---|---|---|---|
| 2013/0069579 A1* | 3/2013 | Uematsu | ................ | H02P 29/64 |
| | | | | 318/473 |
| 2013/0110449 A1* | 5/2013 | Cheng | ................... | H02H 6/005 |
| | | | | 702/132 |
| 2014/0117909 A1* | 5/2014 | Kim | ....................... | H02P 29/60 |
| | | | | 318/473 |
| 2015/0048772 A1* | 2/2015 | Nagata | .................... | G05B 6/02 |
| | | | | 318/634 |

FOREIGN PATENT DOCUMENTS

| | | | |
|---|---|---|---|
| CN | 101233397 | A | 7/2008 |
| CN | 101360983 | A | 2/2009 |
| CN | 102012272 | A | 4/2011 |
| CN | 102261969 | A | 11/2011 |
| CN | 102539016 | A | 7/2012 |
| CN | 102985799 | A | 3/2013 |
| CN | 104242771 | A | 12/2014 |
| CN | 102574534 | B | 2/2015 |
| DE | 19634368 | C2 | 11/2000 |
| DE | 102009030206 | A1 | 12/2010 |
| DE | 102010019113 | A1 | 11/2011 |
| DE | 102013016911 | A1 | 7/2014 |
| DE | 102013007631 | A1 | 11/2014 |
| JP | 6282692 | A | 4/1987 |
| JP | 62203578 | A | 9/1987 |
| JP | 2013160502 | A | 8/2013 |
| JP | 2014239631 | A | 12/2014 |

OTHER PUBLICATIONS

English Translation of Japanese Publication No. 2013160502, published Aug. 19, 2013, 22 pages.
Untranslated Notification of Reasons for Refusal mailed by JPO, dated Mar. 8, 2016, 2 pages.
English machine translation of Notification of Reasons for Refusal mailed by JPO, dated Mar. 8, 2016, 2 pages.
Untranslated Decision to Grant a Patent mailed by JPO, dated May 17, 2016, 3 pages.
English machine translation of Decision to Grant a Patent mailed by JPO, dated May 17, 2016, 3 pages.
English Abstract for Japanese Publication No. 62-203578 A, published Sep. 8, 1987, 1 pg.
English bibliographic information for Japanese Publication No. 62-82692 A, published Apr. 16, 1987 (no English Abstract or description is available), 1 pg.
English Abstract for Chinese Publication No. 102574534 B published Feb. 11, 2015, 2 pgs.
English Abstract and Machine Translation for Chinese Publication No. 104242771 A published Dec. 14, 2014, 13 pgs.
English Abstract and Machine Translation for Chinese Publication No. 102985799 A published Mar. 20, 2013, 11 pgs.
English Abstract and Machine Translation for Chinese Publication No. 102261969 A published Nov. 30, 2011, 9 pgs.
English Abstract and Machine Translation for Chinese Publication No. 102012272 A published Apr. 13, 2011, 11 pgs.
English Abstract and Machine Translation for Chinese Publication No. 101233397 A published Jul. 30, 2008, 11 pgs.
English Abstract and Machine Translation for Chinese Publication No. 101115977 A published Jan. 30, 2008, 11 pgs.
English Abstract and Machine Translation for Chinese Publication No. 1584523 A published Feb. 23, 2005, 2 pgs.
English Abstract and Machine Translation for German Publication No. 102013007631 A, published Nov. 6, 2014, 14 pgs.
English Machine Translation and Abstract for Chinese Publication No. 102539016 A, published Jul. 4, 2012, 11 pgs.
English Machine Translation and Abstract for Chinese Publication No. 101360983 A, published Feb. 4, 2009, 20 pgs.
English Abstract and Machine Translation for German Publication No. 102013016911 A1, published Jul. 10, 2014, 9 pgs.
English Abstract and Machine Translation for German Publication No. 102010019113 A1, published Nov. 3, 2011, 13 pgs.
English Abstract and Machine Translation for German Publication No. 102009030206 A1, published Dec. 30, 2010, 7 pgs.
English Abstract and Machine Translation for German Publication No. 19634368 C2, published Nov. 23, 2000, 5 pgs.

* cited by examiner

34 = TEMPERATURE SENSOR
40 = ROTOR
50 = STATOR
52 = STATOR CORE
54 = WINDING

102 = TEMPERATURE DETECTING ELEMENT
104 = LEAD
106 = RESIN

TEMPERATURE ESTIMATING DEVICE OF ELECTRIC MOTOR

BACKGROUND OF THE INVENTION

1. Field of the Invention

The present invention relates to a temperature estimating device configured to estimate the temperature of an electric motor.

2. Description of the Related Art

According to a known method of detecting or estimating the temperature of an electric motor, loss is estimated from current supplied to the electric motor and the loss obtained by this estimate is used as the basis to calculate the temperature of the electric motor. According to another known temperature estimation method, a temperature sensor provided inside of the electric motor is utilized. A temperature sensor is generally attached near a main heat generating source of the electric motor, that is, a winding. Due to this, it is possible to monitor the state of heat generation in the electric motor.

FIG. 8 shows an example of the configuration of a temperature sensor 100. The temperature sensor 100 is provided with a temperature detecting element 102 and a lead 104 connected to the temperature detecting element 102. The temperature detecting element 102 is covered by a resin 106 so as to improve insulating ability and heat resistance. In the case of such a temperature sensor 100, since the heat capacity of the resin 106 is relatively large, the heat generated from the winding is sometimes not transmitted to the temperature detecting element 102 sufficiently fast. For this reason, the detected temperature detected by the temperature sensor 100 cannot keep up with the change of the actual temperature of the electric motor (winding) and as a result the temperature of the electric motor can no longer be accurately detected. This is particularly remarkable when the amount of temperature change of the winding with respect to time is large.

FIG. 9 shows the detected temperature obtained by the temperature sensor 100 and the actual temperature of the winding. The solid line in the figure shows the detected temperature, while the dashed line shows the winding temperature. As shown in the figure, in the range of the region X, the amount of change of the winding temperature with respect to time is relatively large. Therefore, it can be understood that the difference between the detected temperature and the winding temperature becomes larger. As opposed to this, in the range of the region Y, the amount of change of the winding temperature with respect to time is relatively small and thus the difference of the detected temperature and the winding temperature is small.

With the method of estimating the temperature of an electric motor from the loss occurring in the electric motor, the configuration required for estimating the temperature is complicated. On the other hand, with the method of using a temperature sensor, as explained above, it is difficult to accurately detect the temperature of an electric motor.

Japanese Patent Publication No. S62-082692A discloses an induction heating cooker wherein an amount of power supplied to a heating winding is controlled in accordance with a rate of change of detected temperature with respect to time for the purpose of preventing overheating in such a cooker. However, Japanese Patent Publication No. S62-082692A does not disclose estimating the temperature of an object to be measured.

Japanese Patent Publication No. S62-203578A discloses a method of controlling startup of an induction electric motor configured so as to predict a temperature change of a winding and to warn an operator and restrict startup of the electric motor when it is predicted that the winding temperature will reach a predetermined temperature or more. However, the invention described in Japanese Patent Publication No. S62-203578A predicts the winding temperature during operation from the winding temperature detected before startup of the electric motor and cannot accurately detect the actual temperature of the electric motor.

Therefore, there is a need for a temperature estimating device which can accurately estimate the temperature of an electric motor by a simple method.

SUMMARY OF THE INVENTION

According to a first aspect of the present application, there is provided a temperature estimating device configured to estimate a temperature of an electric motor, the temperature estimating device comprising: a temperature detecting part configured to acquire a detected temperature detected by a temperature sensor attached to the electric motor; a memory part configured to successively store the detected temperature acquired by the temperature detecting part at a predetermined sampling period; and a temperature estimating part configured to use the detected temperature stored by the memory part, a ratio of amount of change of the detected temperature with respect to time, and a coefficient as the basis to estimate a temperature of a measurement target part of the electric motor.

According to a second aspect of the present application, there is provided the temperature estimating device according to the first aspect of the invention wherein the ratio of amount of change of the detected temperature with respect to time is an average value of a plurality of ratios of amount of change of the detected temperature with respect to time obtained from the detected temperature stored by the memory part.

According to a third aspect of the present application, there is provided the temperature estimating device according to the first or second aspect of the invention wherein the coefficient is determined based on a heat capacity of the temperature sensor and a heat capacity of the measurement target part.

According to a fourth aspect of the present application, there is provided the temperature estimating device according to any one of the first to third aspects of the invention wherein the memory part is configured to store an estimated temperature of the measurement target part estimated by the temperature estimating part, and the temperature estimating part is configured to estimate a temperature of the measurement target part in accordance with a recurrence relation including the estimated temperature of the measurement target part stored by the memory part, the ratio of amount of change of the detected temperature with respect to time, and the coefficient.

According to a fifth aspect of the present application, there is provided the temperature estimating device according to any one of the first to fourth aspects of the invention wherein the temperature estimating device further comprises a coefficient changing part configured to change the coefficient, wherein the coefficient changing part is configured to change the coefficient based on whether or not the electric motor is provided with a cooling device, and further, when the electric motor is provided with a cooling device, based on a cooling performance of the cooling device.

According to a sixth aspect of the present application, there is provided the temperature estimating device according to any one of the first to fifth aspects of the invention wherein the temperature estimating device further comprises an overheating judging part configured to use the estimated temperature of the measurement target part estimated by the temperature estimating part as the basis to judge whether or not the electric motor is in an overheated state.

These and other objects, features and advantages of the present invention will become more apparent in light of the detailed description of exemplary embodiments thereof as illustrated in the drawings.

DETAILED DESCRIPTION

Below, embodiments of the present invention will be described while referring to the above drawings. The constituent elements of the illustrated embodiments may be changed in scale as necessary to facilitate understanding of the present invention. Further, the same or corresponding constituent elements are assigned the same reference notations throughout the plurality of drawings.

Figure 1:
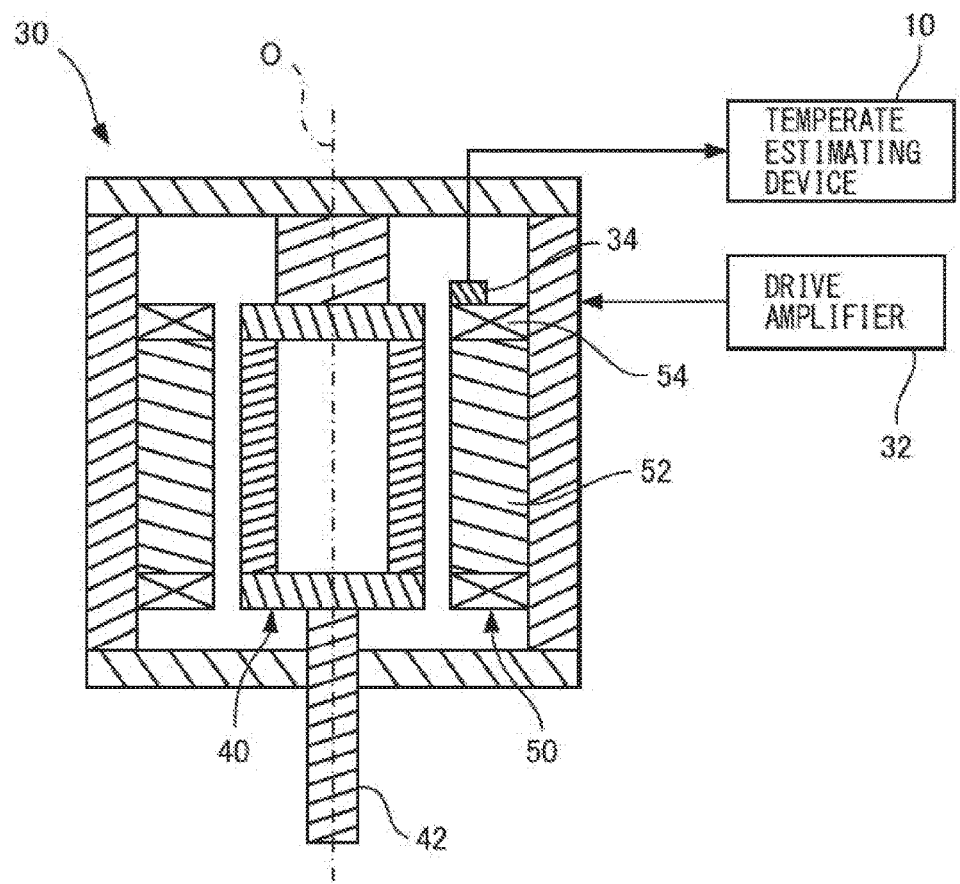
FIG. 1 is a schematic view showing an example of the configuration of an electric motor which can be used together with a temperature estimating device according to one embodiment.

FIG. 1 is a schematic view showing an example of the configuration of an electric motor which can be used together with a temperature estimating device according to one embodiment. The electric motor 30 is provided with a rotor 40 having a rotational axis 42 rotatable about a rotational axis line O and a stator 50 disposed concentrically with the rotor 40 outside of the rotor 40 in the radial direction. The stator 50 is provided with a stator core 52 having a generally cylindrical shape and a winding 54 attached to the stator core 52. Further, the electric motor 30 has a drive amplifier 32 connected thereto. The drive amplifier 32 is used to supply current to the winding 54.

The electric motor 30 is further provided with a temperature sensor 34 attached to the winding 54 and a temperature estimating device 10 using the detected temperature detected by the temperature sensor 34 as the basis to estimate the temperature of the electric motor 30. The temperature estimating device 10 is a digital computer having a known configuration including a CPU, a ROM, a RAM, and an interface used for sending and receiving data and signals with various external devices. The temperature estimating device 10 may be built into a control device (not shown) configured to control the electric motor 30 or may be provided separately from the control device.

Figure 8:
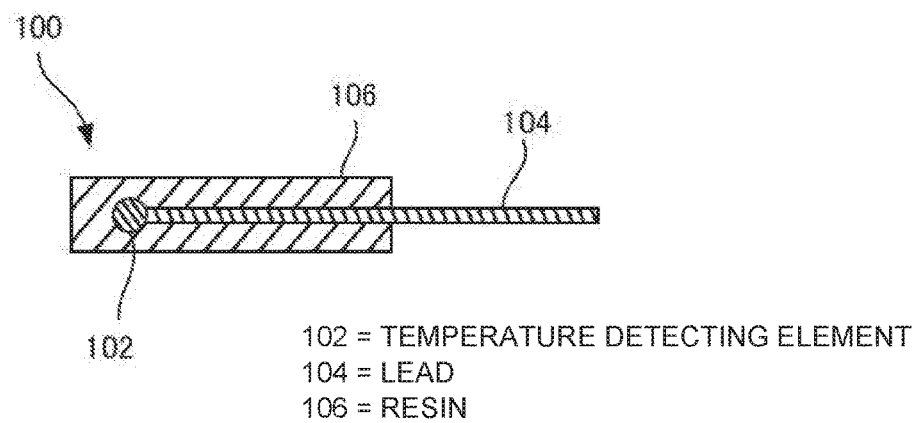
FIG. 8 is a view showing an example of the configuration of a temperature sensor.

The temperature sensor 34 is, for example, a thermistor having a known form as described above with reference to FIG. 8 by way of example. The temperature sensor 34 is configured to detect a change in the resistance value of the thermistor accompanying a change in the temperature of the winding 54 and output it as a temperature detection signal. However, a person skilled in the art would recognize that another type of temperature sensor can be applied in the same way to the present invention.

Figure 2:
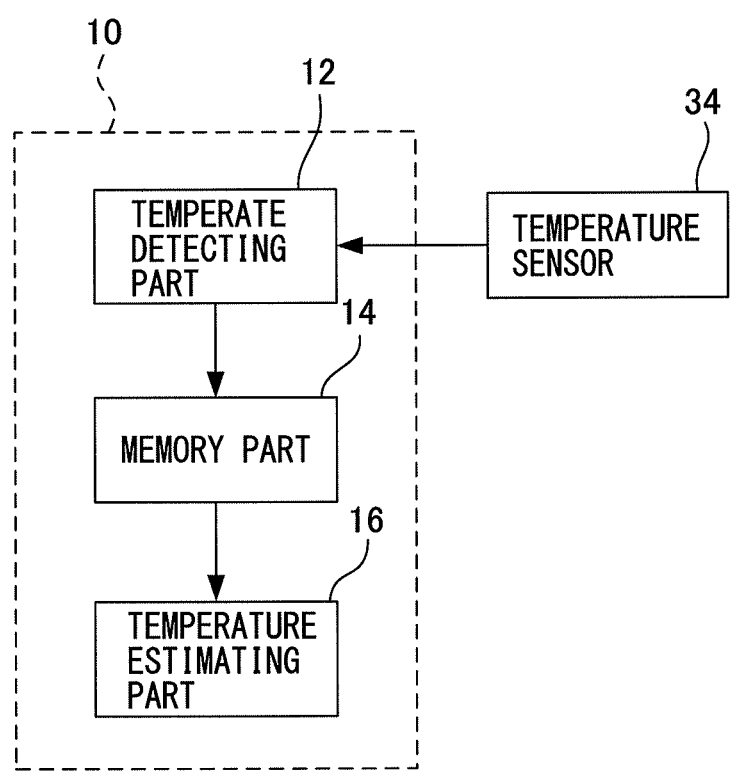
FIG. 2 is a functional block diagram of a temperature estimating device according to one embodiment.

FIG. 2 is a functional block diagram of a temperature estimating device 10 according to one embodiment. As illustrated, the temperature estimating device 10 is provided with a temperature detecting part 12, a memory part 14, and a temperature estimating part 16.

The temperature detecting part 12 acquires the detected temperature detected by the temperature sensor 34. The temperature sensor 34 is disposed so as to contact the winding 54 (see FIG. 1) or to be sufficiently in the proximity of the winding 54. However, the present invention is not limited to such a specific configuration. The temperature sensor 34 may also be provided at any measurement target part of an electric motor 30 where the temperature should be detected. The detected temperature acquired by the temperature detecting part 12 is read out by the memory part 14.

The memory part 14 cooperates, for example, with the RAM of the temperature estimating device 10 or another memory device to store the detected temperature acquired by the temperature detecting part 12. The memory part 14 is configured to successively store the detected temperature over a predetermined measurement time at a predetermined sampling period. A person skilled in the art could easily determine the suitable measurement time and suitable sampling period, depending on the type of the electric motor 30 and the operating conditions of the electric motor 30.

The temperature estimating part 16 uses the detected temperatures stored by the memory part 14, the ratios of the amounts of change of these detected temperatures with respect to time (that is, the amount of change of the detected temperature per unit time), and a predetermined coefficient as the basis to estimate the temperature of a measurement target part of the electric motor 30, that is, in the illustrated embodiment, the temperature of the winding 54. In the following, for the sake of simplification, the exemplary case where the "winding 54" is the measurement target part will be described.

Figure 9:
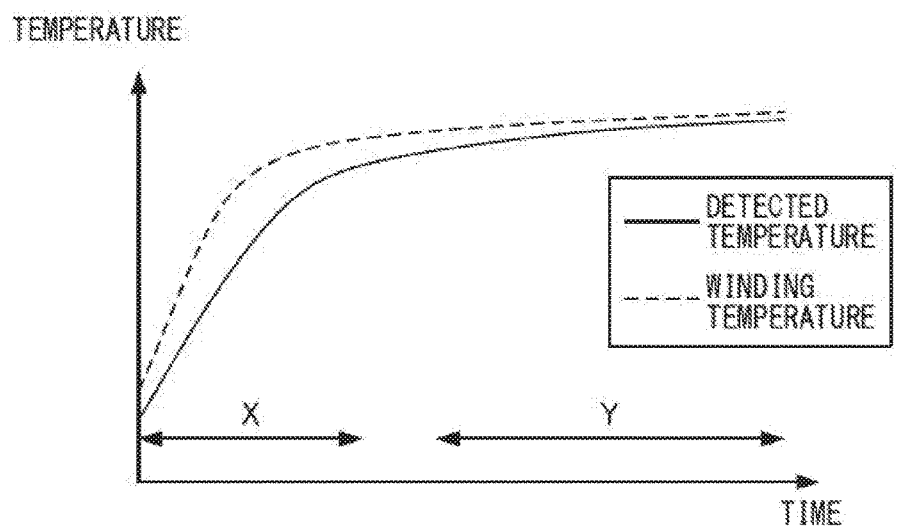
FIG. 9 is a graph showing a detected temperature and winding temperature.

As described above with reference to FIG. 9, the difference between the detected temperature detected by the temperature sensor 34 and the actual temperature of the winding 54 increases or decreases, depending on the amount of change of the temperature of the winding 54 per unit time. Therefore, according to the temperature estimating device 10 of the embodiment, the temperature estimating part 16 is configured to weight the detected temperature of the temperature sensor 34 in accordance with the ratio of the amount of change of the detected temperature with respect to time which is most recently stored, thereby estimating the temperature of the winding 54. The ratio A of the amount of change of the detected temperature with respect to time in the interval from time $t_1$ to time $t_2$ can be found by the following equation (1):

$$A = \frac{T_2 - T_1}{t_2 - t_1} \qquad \text{Equation (1)}$$

where $T_1$ is the detected temperature at time $t_1$, and $T_2$ is the detected temperature at time $t_2$.

Further, the estimated temperature $T_{c2}$ of the winding at time $t_2$ can be found by the following equation (2):

$$T_{c2} = T_2 + K \cdot A = T_2 + K \cdot \left(\frac{T_2 - T_1}{t_2 - t_1}\right) \qquad \text{Equation (2)}$$

where K is a predetermined coefficient. The coefficient K can be found in accordance with the heat capacity of the temperature sensor 34 and the heat capacity of the winding 54. Specifically, the coefficient K can be determined through tests using actual equipment or through simulation so that the estimated temperature $T_{C2}$ approaches the actual temperature of the winding 54.

Figure 3:
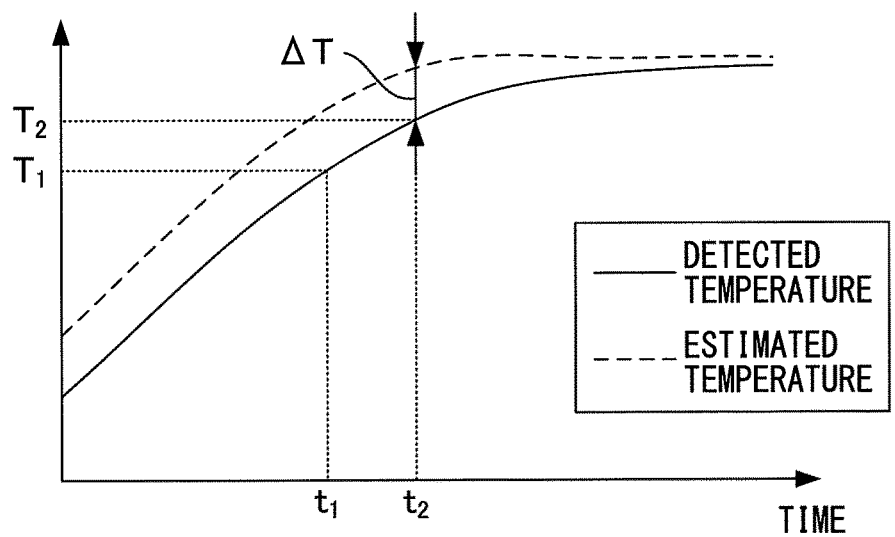
FIG. 3 is a graph showing an estimated temperature of a winding estimated by a temperature estimating device according to one embodiment.

FIG. 3 is a graph showing the detected temperature of the winding 54 acquired by the temperature detecting part 12 and the estimated temperature of the winding 54 estimated by the temperature estimating part 16. In FIG. 3, the solid line shows the detected temperature of the winding 54, while the dashed line shows the estimated temperature of the winding 54 calculated by the equation (2). The larger the ratio of the amount of change of the detected temperature of the winding 54 with respect to time (that is, the larger the magnitude of the slope of the solid line of FIG. 3), the larger the amount of correction ΔT (second term at right side in the equation (2)) given to the detected temperature, and as a result the estimated temperature approaches the actual temperature of the winding 54.

According to the temperature estimating device 10 of the present embodiment, the detected temperature is corrected by weighting in accordance with the ratio of the amount of change of the detected temperature of the measurement target part of the electric motor 30 with respect to time. Therefore, even when the detected temperature cannot keep up with the change of the actual temperature sufficiently quickly due to the difference in the heat capacities, the temperature of the measurement target part can be accurately estimated.

According to another embodiment, the temperature estimating part 16 utilizes, as the ratio of the amount of change of the detected temperature with respect to time utilized to find the estimated temperature of the winding 54, the average value $A_{avr}$ of a plurality of ratios of amounts of change of the detected temperature with respect to time. The average value $A_{avr}$ can be found by the following equation (3):

$$A_{avr} = \frac{1}{n-1} \sum_{n=2}^{n} \frac{T_n - T_{n-1}}{t_n - t_{n-1}} \qquad \text{Equation (3)}$$

where $T_n$ is the detected temperature acquired by the temperature detecting part 12 at time $t_n$ (where "n" is a whole number of 2 or more).

By substituting $A_{avr}$ into "A" in the equation (2), the estimated temperature $T_{Cn}$ of the winding at time $t_n$ can be obtained.

$$T_{cn} = T_n + K \cdot A_{avr} = T_n + K \cdot \left(\frac{1}{n-1} \sum_{n=2}^{n} \frac{T_n - T_{n-1}}{t_n - t_{n-1}}\right) \qquad \text{Equation (4)}$$

Figure 4:
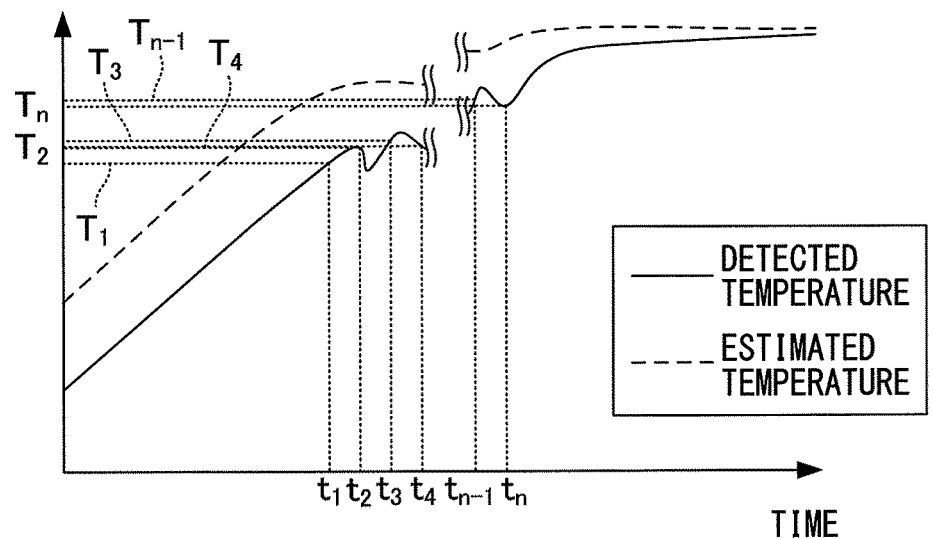
FIG. 4 is a graph showing an estimated temperature of a winding estimated by a temperature estimating device according to another embodiment.

FIG. 4 shows an estimated temperature of the winding 54 obtained by equation (4) using the average value $A_{avr}$ of "n−1" number of ratios of the amount of change of the detected temperature with respect to time during the measurement period from $t_1$ to $t_n$. According to the present embodiment, for example, even when the detected temperature obtained by the temperature sensor 34 greatly increases or decreases during a short time period as shown in FIG. 4 by the solid line, the estimated temperature of the winding 54 can be stably and accurately found.

According to still another embodiment, the memory part 14 is configured to successively store the estimated temperature of the winding 54 estimated by the temperature estimating part 16. Further, the temperature estimating part 16 is configured to estimate the temperature of the winding 54 in accordance with a recurrence relation (the equation (6) described below) including the latest estimated temperature of the winding 54 stored by the memory part 14, the ratio of the amount of change of the detected temperature with respect to time, and a coefficient.

The ratio A(n) of the amount of change of the detected temperature with respect to time during the time period from time $t_{n-1}$ to time $t_n$ can be found by the following equation (5):

$$A(n) = \frac{T_n - T_{n-1}}{t_n - t_{n-1}} \qquad \text{Equation (5)}$$

where "n" is a whole number of 2 or more.

Further, the estimated temperature $T_{cn}$ at time $t_n$ can be found in accordance with the following equation (6) by substituting "A(n)" into "A" in the equation (2).

$$T_{cn} = T_n + K \cdot A(n) = T_n + K \cdot \left(\frac{T_n - T_{n-1}}{t_n - t_{n-1}}\right) \qquad \text{Equation (6)}$$

Further, the estimated temperature $T_{cn+1}$ at time $t_{n+1}$ can be found as follows using the estimated temperature $T_{cn}$ found by the equation (6).

$$T_{cn+1} = T_{cn} + K \cdot A(n+1) = T_{cn} + K \cdot \left(\frac{T_{n+1} - T_n}{t_{n+1} - t_n}\right) \qquad \text{Equation (7)}$$

Figure 5:
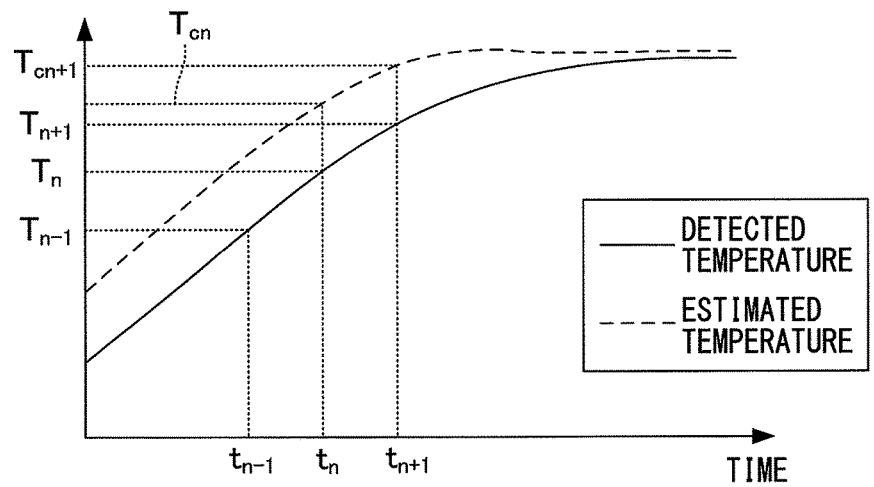
FIG. 5 is a graph showing an estimated temperature of a winding estimated by a temperature estimating device according to still another embodiment.

FIG. 5 shows the estimated temperature of the winding 54 found by the above-mentioned recurrence relation (the equation (7)). As illustrated, according to the temperature estimating part 16 configured in accordance with the present embodiment, the estimated temperature of the winding 54 is obtained by weighing the detected temperature in accordance with the ratio of the amount of change of the detected temperature detected by the temperature sensor 34 with respect to time. Therefore, in the same way as the temperature estimating device 10 according to the above-mentioned embodiment, the temperature of the winding 54 and in turn the temperature of the electric motor 30 can be accurately estimated.

Figure 6:
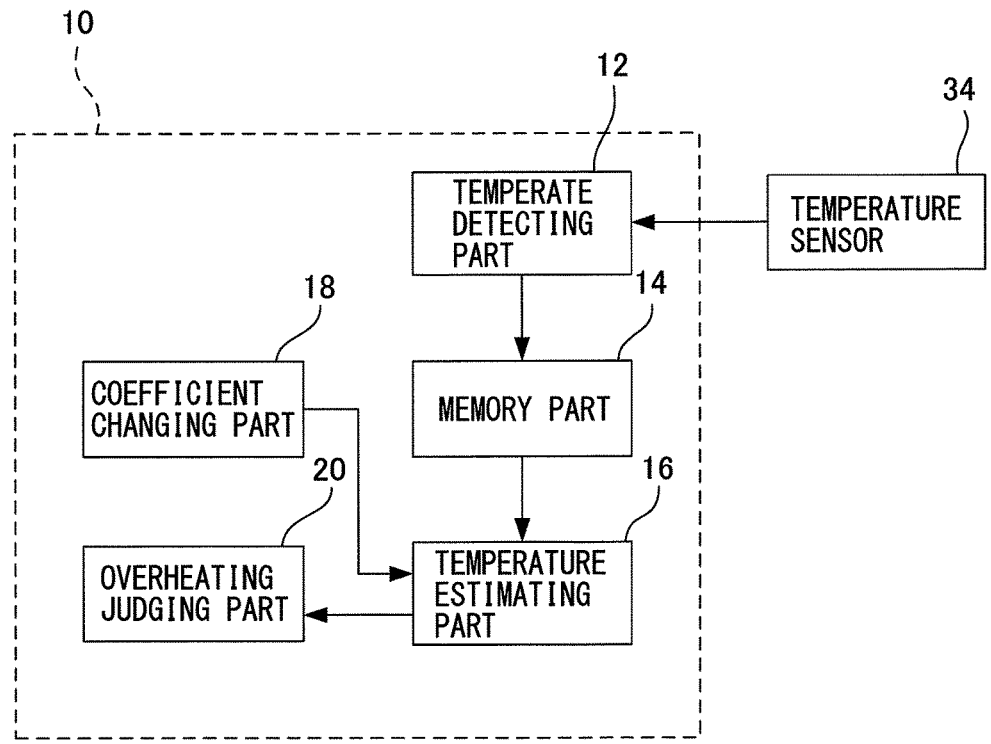
FIG. 6 is a functional block diagram of a temperature estimating device according to still another embodiment.

FIG. 6 is a functional block diagram of a temperature estimating device 10 according to still another embodiment. As will be understood by a comparison with FIG. 2, the temperature estimating device 10 according to the present embodiment is further provided with a coefficient changing part 18 and an overheating judging part 20.

The coefficient changing part 18 changes the coefficient used for estimation of the temperature of the winding 54 in accordance with whether or not the electric motor 30 is provided with a cooling device (not shown), and further, when it is provided with a cooling device, in accordance with the cooling performance of the cooling device.

Figure 7A:
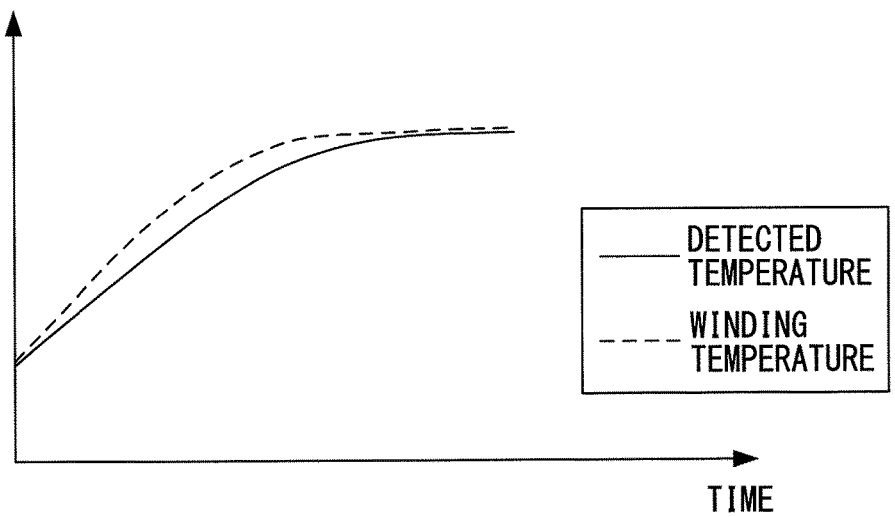
FIG. 7A is a graph showing a detected temperature and winding temperature when an electric motor is not provided with a cooling device.
Figure 7B:
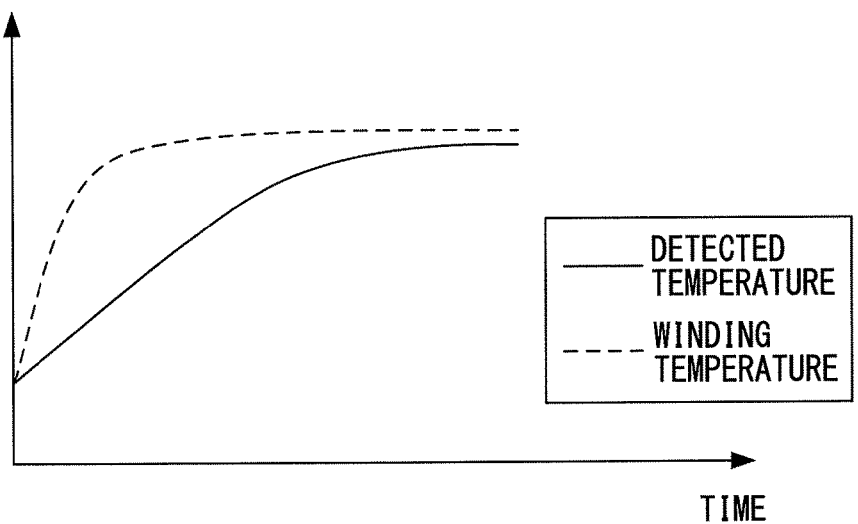
FIG. 7B is a graph showing a detected temperature and winding temperature when an electric motor is provided with a cooling device.

FIG. 7A shows the detected temperature of the winding 54 and the actual temperature of the winding 54 when the electric motor 30 is not provided with a cooling device. Further, FIG. 7B shows the detected temperature of the winding 54 and the actual temperature of the winding 54 when the electric motor 30 is provided with a cooling device. As will be understood by comparison of FIG. 7A and FIG. 7B, when the electric motor 30 is provided with a cooling device, the difference between the detected temperature of the winding 54 detected by the temperature sensor 34 and the actual temperature of the winding 54 tends to become larger. This is particularly remarkable when the electric motor 30 is a fan or other cooling device having a forced cooling action.

Therefore, when the electric motor 30 is provided with a cooling device, the coefficient used for estimation of the temperature of the winding 54 is changed so as to be larger than when the electric motor 30 is not provided with a cooling device, so that the estimated temperature estimated by the temperature estimating part 16 can be closer to the actual temperature of the winding 54. In the same way, the coefficient is changed so as to be larger as the cooling performance of the cooling device increases, so that the estimated temperature can be closer to the actual temperature of the winding 54.

According to the present embodiment, the coefficient changing part 18 is configured to change the coefficient used for estimating the temperature of the winding 54 by the temperature estimating part 16 in accordance with the cooling action for the electric motor 30. Specifically, the correlation between the cooling performance of the cooling device and a suitable coefficient is determined through tests or simulations, and their results are used to prepare a parameter or reference table in advance. The coefficient changing part 18 utilizes the parameter or reference table to change the coefficient. According to the present embodiment, regardless of whether a cooling device is provided or the quality of the cooling performance, the estimated temperature of the winding 54 and in turn the temperature of the electric motor 30 can be accurately found.

The overheating judging part 20 compares the estimated temperature which is estimated by the temperature estimating part 16 and a predetermined threshold value to judge whether or not the electric motor 30 is in an overheated state. When it is judged by the overheating judging part 20 that the electric motor 30 is in an overheated state, for example an alarm sound may be generated or an alarm message may be displayed on a display device, if any. Therefore, an operator can easily recognize when the electric motor 30 is in an overheated state.

EFFECT OF THE INVENTION

According to the temperature estimating device of the present invention, the ratio of the amount of change of the detected temperature detected by the temperature sensor with respect to time is used as the basis to weight the detected temperature. Due to this, the temperature of the electric motor can be accurately estimated. Further, according to the temperature estimating device of the present invention, it is possible to estimate the temperature of an electric motor with a simple configuration, compared with the known method of monitoring the current supplied to an electric motor and estimating the loss from the obtained current.

Although various embodiments and variants of the present invention have been described above, it is apparent for a person skilled in the art that the intended functions and effects can also be realized by other embodiments and variants. In particular, it is possible to omit or replace a constituent element of the embodiments and variants, or additionally provide a known means, without departing from the scope of the present invention. Further, it is apparent for a person skilled in the art that the present invention can be implemented by any combination of features of the embodiments either explicitly or implicitly disclosed herein.

What is claimed is:

1. A temperature estimating system for estimating an actual temperature of a measurement target part of an electric motor, the temperature estimating system comprising:

the electric motor;

a temperature sensor attached to the measurement target part of the electric motor, the measurement target part being a winding of the electric motor, and the temperature sensor comprises a temperature detecting element and a resin covering the temperature detecting element;

a memory configured to store a detected temperature detected by the temperature sensor;

a processor that performs processing for correcting the detected temperature stored in the memory to an estimated temperature on the basis of the detected temperature; and an alarm that generates an alarm sound or displays an alarm message upon receiving a respective command from the processor, wherein the processor is programmed to:

acquire the detected temperature detected by the temperature sensor to successively store the detected temperature in the memory at a predetermined sampling period;

calculate a first estimated temperature by weighting the detected temperature on the basis of amount of change of the detected temperature per unit time or average value of amounts of change thereof and a coefficient that is predetermined so that an estimated temperature of the measurement target part approaches the actual temperature of the measurement target part, and further calculate a second estimated temperature by weighting the first estimated temperature on the basis of the amount of change of the detected temperature per unit time or the average value of amounts of change thereof and the coefficient; and judge whether the electric motor is in an overheated state by comparing the second estimated temperature with a predetermined threshold value and issue a warning command to the alarm when it is judged that the electric motor is in the overheating state;

wherein the first estimated temperature $T_{cn}$ at time $t_n$, where "n" is a whole number of 2 or more, is calculated using the equation:

$$T_{cn} = T_n + K \cdot A_{avr} = T_n + K \cdot \left( \frac{1}{n-1} \sum_{n=2}^{n} \frac{T_n - T_{n-1}}{t_n - t_{n-1}} \right)$$

wherein:

$T_n$ is the detected temperature of the measurement target part at the time $t_n$, K is the coefficient, $t_{n-1}$ is time before the time $t_n$, $A_{avr}$ is the average value of amounts of change of the detected temperature per the unit time, and $T_{n-1}$ is the detected temperature of the measurement target part at the time $t_{n-1}$, and wherein the second estimated temperature $T_{cn+1}$ at time $t_{n+1}$, where "n" is a whole number of 2 or more is calculated, using the following equation:

$$T_{cn+1} = T_{cn} + K \cdot A(n+1) = T_{cn} + K \cdot \left( \frac{T_{n+1} - T_n}{t_{n+1} - t_n} \right)$$

wherein:

$t_{n+1}$ is time after the time $t_n$, $A(n+1)$ is the amount of change of the detected temperature per the unit time during the time period from the time $t_n$ to the time $t_{n+1}$, and $T_{n+1}$ is the detected temperature of the measurement target part at the time $t_{n+1}$.

2. The temperature estimating system according to claim 1, wherein the processor further changes the coefficient so that the coefficient becomes larger when the electric motor is provided with a cooling device and change the coefficient so that the coefficient becomes larger as cooling performance of the cooling device increases.

* * * * *